United States Patent [19]

Tefertiller et al.

[11] 4,397,993

[45] Aug. 9, 1983

[54] CURABLE OXIRANE POLYMERS

[75] Inventors: Nancy B. Tefertiller; Robert F. Harris, both of Midland, Mich.

[73] Assignee: The Dow Chemical Company, Midland, Mich.

[21] Appl. No.: 339,916

[22] Filed: Jan. 18, 1982

Related U.S. Application Data

[63] Continuation of Ser. No. 145,917, May 2, 1980, abandoned.

[51] Int. Cl.$^3$ ............................................. C08F 8/08
[52] U.S. Cl. ............................... 525/328.2; 525/384; 525/330.5; 526/273; 526/301
[58] Field of Search ................. 525/384, 328.2, 330.5; 526/273, 301

[56] References Cited

U.S. PATENT DOCUMENTS

| | | | |
|---|---|---|---|
| 2,514,328 | 4/1950 | Jones | 260/8 |
| 2,718,516 | 9/1955 | Bortnick | 260/86.1 |
| 3,242,140 | 3/1966 | Hoover | 260/77.5 |
| 3,743,626 | 7/1973 | Emmons et al. | 260/77.5 AQ |
| 3,928,299 | 12/1975 | Rosenkranz et al. | 260/84.5 N |
| 4,008,247 | 2/1977 | Tucker | 260/308 B |
| 4,181,642 | 1/1980 | Holle et al. | 260/37 EP |

FOREIGN PATENT DOCUMENTS 1354783 5/1974 United Kingdom .

OTHER PUBLICATIONS

Journal of Coatings Technology, "Coatings from Vinyl Isocyanate Monomer", pp. 82–86, Woo et al., vol. #49, 632, 9–77.

*Primary Examiner*—Joseph L. Schofer
*Assistant Examiner*—Bernard Lipman
*Attorney, Agent, or Firm*—Jeffrey S. Boone

[57] ABSTRACT

An addition polymer having a carbon-to-carbon backbone bearing at least two oxirane moieties per polymer molecule wherein the oxirane moieties are the reaction product of an isocyanate moiety and a glycidyl compound, such as glycidol, is readily cured to form a solid insoluble material.

12 Claims, No Drawings

CURABLE OXIRANE POLYMERS

CROSS-REFERENCE TO RELATED APPLICATION

This is a continuation of application Ser. No. 145,917, filed May 2, 1980, now abandoned.

BACKGROUND OF THE INVENTION

This invention relates to curable oxirane polymers comprising an addition polymer backbone bearing pendant oxirane groups.

Coatings based on epoxy resins, i.e., those derived from oxirane polymers, provide good solvent resistance, hardness, adhesion and the like and are therefore widely used as coatings for a wide variety of substrates such as metal, wood, plastic and the like. Unfortunately, however, such coatings are noted for their tendency to yellow and chalk when exposed to ultraviolet light and other weathering conditions.

This yellowing tendency is particularly evident when aromatics, such as bisphenol A, are employed as monomeric components of the resin and/or when amines, such as diethylenetriamine and the like, are used as curing agents. Accordingly, epoxy resin compositions, wherein the problems of yellowing, chalking and other deterioration caused by exposure to light are minimized, have been pursued by the coating industries for a substantial period of time.

In view of the aforementioned deficiencies of conventional epoxy resin compositions and the desire of the coating industries to employ epoxy resin compositions free from such deficiencies, it is highly desirable to provide a hard, adhesive, solvent-resistant coating derived from an oxirane polymer which coating exhibits increased resistance to degradation upon exposure to ultraviolet light and other conditions common to the environment.

SUMMARY OF THE INVENTION

In one aspect, the present invention is an addition polymer (hereinafter called an oxirane polymer) having a carbon-to-carbon polymeric backbone bearing at least two oxirane moieties per polymer molecule wherein the oxirane moieties are represented by the formula:

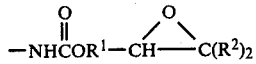

wherein $R^1$ is alkylene or inertly substituted alkylene such as haloalkylene and each $R^2$ is independently hydrogen, alkyl, or inertly substituted alkyl such as haloalkyl.

Oxirane polymers which contain unreacted isocyanate groups as well as oxirane groups are self-crosslinking (i.e., cure without the addition of chemical curing agents). However, for oxirane polymers containing no unreacted isocyanate groups, a chemical curing agent is usually required.

Accordingly, in another aspect, this invention is a curable composition comprising (1) the aforementioned oxirane polymer and (2) an epoxy curing agent. The proportions of epoxy curing agent and oxirane polymer are such that the composition cures to a water- and hydrocarbon-insoluble solid upon exposure to conditions sufficient to cause the oxirane groups of the oxirane polymer to react with the curing agent.

In yet another aspect, the present invention is a method for coating substrates such as metal, wood, paper, plastic, glass and the like, by applying a coating composition comprising the aforementioned oxirane polymer or the curable composition to the substrate and, subsequently, curing the coating by subjecting the coated substrate to conditions sufficient to cause reaction of the oxirane groups with the active hydrogen groups.

In yet another aspect, this invention is the cured material resulting from subjecting the aforementioned curable composition to curing conditions.

In the practice of this invention, complete cure is achieved using a wide range of compositions which are tailored to fit the requirements of the particular coating application, for example, coatings for office furniture, industrial maintenance and metal decorations. The invention provides a single coat system having the desirable properties of coatings normally achieved by first applying an epoxy primer and then a polyurethane topcoat.

Surprisingly, the practice of the present invention yields a coating which neither chalks nor discolors upon exposure to conditions characteristic of the environment. The resulting coatings exhibit the excellent hardness and chemical resistance that is characteristic of a coating consisting entirely of epoxy resin. Finally, the curable compositions of the present invention are generally less hazardous to individuals employing the composition in that essentially no toxic by-products or residual materials are released to the environment. Moreover, in contrast to coatings employing blocked isocyanates, no materials are released in the practice of this invention that plasticize or otherwise adversely affect the cured composition.

DETAILED DESCRIPTION OF REPRESENTATIVE EMBODIMENTS

The oxirane polymers of the present invention are addition polymers having carbon-to-carbon polymeric backbones which bear at least two oxirane moieties as described hereinbefore. Preferably, the oxirane moieties are represented by the formula:

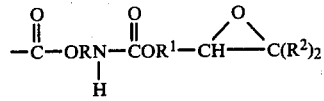

wherein R is alkylene having 2 to 6 carbons or inertly substituted alkylene such as haloalkylene and $R^1$ and $R^2$ are as defined hereinbefore. More preferably, R has 2 to 4 carbons, $R^1$ has 1 to 4 carbons and $R^2$ is hydrogen or alkyl having 1 to 3 carbons. Most preferably, R is ethylene, $R^1$ is methylene and each $R^2$ is hydrogen. In addition, oxirane polymers which are self-crosslinking also bear pendant unreacted isocyanate moieties, preferably isocyanate moieties represented by the formula:

wherein R is as defined hereinbefore. The oxirane polymers of this invention are advantageously prepared by the reaction of an isocyanate polymer (as defined hereinafter) and an oxirane which is substituted with an active hydrogen group such as hydroxyl which is not highly reactive with oxirane groups under the condition of use (hereinafter such an oxirane shall be called a "glycidyl compound").

The isocyanate polymer is preferably an addition polymer having a carbon-to-carbon polymeric backbone which bears at least two isocyanatohydrocarbyl ester groups per polymer molecule. Exemplary isocyanate polymers include the homopolymers and copolymers of isocyanatoalkyl esters of $\alpha,\beta$-ethylenically unsaturated carboxylic acids such as 2-isocyanataoethyl methacrylate; 2-isocyanatoethyl acrylate; 3-isocyanatopropyl methacrylate; 1-methyl-2-isocyanatoethyl methacrylate and 1,1-dimethyl-2-isocyanatoethyl acrylate with 2-isocyanatoethyl methacrylate being most preferred. Suitable methods for preparing said isocyanato esters are well known, e.g., as shown in U.S. Pat. Nos. 2,718,516 and 2,821,544 and British Pat. No. 1,252,099. Suitably employed in the practice of this invention are other ethylenically unsaturated isocyanates such as vinyl isocyanate, vinylbenzyl isocyanate and vinylphenyl isocyanate.

Exemplary comonomers employed in the copolymers of the aforementioned isocyanato esters are blocked isocyanatoalkyl esters wherein the isocyanate groups of one of the aforementioned esters are blocked with conventional isocyanate blocking agents, e.g., 2-isocyanatoethyl methacrylate blocked with methyl ethyl ketoneoxime, $\epsilon$-caprolactam or methyl salicylate; primarily aliphatic comonomers such as the alkyl esters of $\alpha,\beta$-ethylenically unsaturated carboxylic acids including the acrylate and methacrylate esters, e.g., methyl acrylate and methacrylate, ethyl acrylate, butyl acrylate, cyclohexyl acrylate and the like; ethylenically unsaturated nitriles such as acrylonitrile; vinyl esters of saturated carboxylic acids such as vinyl acetate; ethylenically unsaturated carboxylic acids such as acrylic acid, methacrylic acid, fumaric acid, maleic acid, itaconic acid as well as half esters of the aforementioned unsaturated dicarboxylic acids, and similar copolymerizable ethylenically unsaturated aliphatic monomers. In addition, it is possible and sometimes desirable to include up to 30 weight percent of an aromatic comonomer such as styrene, vinyl toluene, t-butyl styrene and the like in the aforementioned copolymers.

The monomer constituency of the isocyanate polymers employed in the present invention is not particularly critical provided that the polymer contains at least two of the isocyanate groups per polymer molecule. Preferably, however, the isocyanate polymer contains from about 1 to about 100, most preferably 5 to 90, mole percent of the isocyanatoalkyl ester comonomer and from about 99 to about 0, most preferably 95 to 10, mole percent of other comonomers.

The isocyanate polymer is preferably prepared by subjecting a solution of monomer(s) under an inert atmosphere and in the presence of a free-radical generating initiator to elevated temperatures while agitating the polymerization recipe. Suitable solvents for the polymerization include ethyl acetate, 2-ethoxyethyl acetate, toluene and blends thereof with 2-ethoxyethyl acetate being preferred. The polymerization temperature may range from 60° to about 170° C., with 80° to about 130° C. being preferred and 100° to 115° C. being most preferred when azo catalysts such as azobis(isobutyronitrile) are used. Exemplary free-radical generating initiators include azo compounds such as azobis(isobutyronitrile); peroxygen compounds such as t-butyl peroxide, benzoyl peroxide and cumyl peroxide; and the like. Effective amounts of such initiators are preferably in the range from about 0.1 to about 10 weight percent based on monomers, especially from about 1 to about 5 weight percent.

Reactive glycidyl compounds preferably employed in the preparation of the oxirane polymer are those which bear at least one oxirane group and at least one reactive group. The reactive group is capable of reacting with an isocyanate group of the isocyanate polymer under conditions which do not cause the destruction or reaction of significant amounts, e.g., less than 10 mole percent of total oxirane added during the reaction, of the oxirane group. Examples of such reactive groups are hydroxyl and other groups which contain an active hydrogen which is about as active as hydroxyl. Representative reactive glycidyl compounds include glycidol, 2-hydroxymethyl-2-methyl oxirane, 2-(4-hydroxybutyl)oxirane, 2-hydroxymethyl-3-methyl oxirane and the like, with glycidol and substituted glycidols being preferred. In fact, glycidols are required for the preparation of self-crosslinking oxirane polymers described hereinafter.

The oxirane polymer is prepared by combining the reactive glycidyl compound with the isocyanate polymer under conditions sufficient to cause the reactive group(s) of the glycidyl compound to react with the isocyanate groups of the isocyanate polymer to form a urethane-type linkage. Advantageously, when the reactive group is hydroxyl, the reaction is carried out in the presence of a urethane catalyst such as amine or an organometallic catalyst, preferably an organometallic catalyst such as stannous octoate, lead octoate, dibutyltin dilaurate and tin and zinc thiolates. The conditions employed in carrying out the reaction involve maintaining the reaction mixture of the glycidyl compound and isocyanate polymer, preferably dissolved in a nonreactive solvent such as ethyl acetate, toluene or 2-ethoxy ethyl acetate (cellosolve acetate) at a temperature from ambient to about 100° C., preferably from ambient to about 50° C., in a vessel for a reaction time from a few minutes to about 48 hours. To produce an oxirane polymer having essentially no unreacted isocyanate groups (hereinafter such polymer is called an "agent-curable oxirane polymer"), the mole ratio of isocyanate moiety to reactive moiety of the glycidol compound should be no more than one, preferably less than one, most preferably from about 0.3 to about 0.9. When it is desirable to prepare a self-crosslinking oxirane polymer which contains unreacted isocyanate groups as well as oxirane groups, then the mole ratio of isocyanate moiety to reactive moiety of the glycidyl compound is greater than one, preferably from about 1.5:1 to about 5:1. The resulting oxirane polymer having pendant oxirane group(s) is generally used without further purification. If a solvent has been used in the reaction, it can be removed along with unreacted glycidyl, or the solution of the oxirane polymer containing unreacted glycidyl can be employed as is.

The self-crosslinking oxirane polymers of the present invention which contain both unreacted isocyanate groups and oxirane groups can be cured thermally. Since no crosslinking agent is required, such oxirane polymers are considered to be self-crosslinking. The ratio of oxirane and isocyanate groups in the polymer is that required to provide a cured material that is insoluble in water and hydrocarbon. Preferably, this ratio is a oxirane:isocyanate molar ratio of in the range from about 0.1:1 to about 0.8:1, more preferably from about 0.5:1. During the self-crosslinking reaction, the oxirane polymer is preferably heated at temperatures in the range from about 100° to about 250° C., most preferably from about 150° to about 200° C., for periods from about 5 to about 60 minutes, most preferably from about 15 to about 30 minutes. Although not required, it is often desirable to employ a base as catalyst for the self-crosslinking reaction. Examples of suitable catalysts include basic catalysts such as tetraalkyl ammonium halides, e.g., tetrabutyl ammonium iodide, triethylenediamine and others described in *J. Hetero. Chem.*, 7, 331 (1970). When desired, such catalysts are preferably employed in amounts in the range from about 0.1 to about 2, most preferably from about 0.5 to about 1, weight percent based on the weight of the oxirane polymer. When such catalyst are employed, curing temperatures are preferably within the range from about 150° to 185° C. for curing periods within the range from about 5 to about 15 minutes.

Alternative to the aforementioned self-crosslinking techniques, such polymers can be moisture cured by maintaining the self-crosslinking oxirane polymer in an atmosphere having a relative humidity in the range from about 20 to about 100, preferably from about 40 to about 75. Such moisture curing reactions are preferably carried out at temperatures in the range from about 15° to about 35° C. for periods of from about 2 hours to about 21 days.

Finally, both the self-crosslinking oxirane polymers and the agent-curable oxirane polymers of this invention can be reacted with diols and other polyols including polyphenols, polyamines, polymercaptans, polycarboxylates and mixtures thereof which are conventionally employed in combination with polyisocyanates and/or polyepoxides or epoxy resins to form thermoset compositions. Such reactions can be carried out under base or acid conditions as are conventionally employed with polyisocyanates or epoxy resins, e.g., as described in *The Development and Use of Polyurethane Products*, E. W. Doyle, McGraw-Hill Book Company, 1971 and *Handbook of Epoxy Resins*, H. Lee and K. Neville, McGraw-Hill Book Company, 1967. Typically, such cross-linking agents are employed in amounts from about 1 to about 50 weight parts per hundred weight parts (pph) of oxirane polymer, preferably from about 2 to about 10 pph.

The curable compositions of this invention, including the self-crosslinking compositions described hereinbefore, may vary considerably in solids content, for example, from about 10 to about 80 weight percent solids based on the composition, preferably from about 40 to about 60 weight percent. Such compositions may also be formulated with pigments, dyes, inert fillers such as clay, plasticizers, antioxidants, stabilizers, catalysts and the like.

Methods of applying the coatings include such conventional methods as spraying, brushing, dipping, flowing or roller coating. The coatings may be cured under ambient condition or may be baked by conventional methods to harden and crosslink (cure) them. Curing times and temperatures are not critical, with conditions from curing at ambient temperatures for up to several days to baking for a few minutes at elevated temperatures as described hereinbefore.

The following examples are given to illustrate the invention but should not be construed as limiting its scope. All parts and percentages are by weight unless otherwise indicated.

EXAMPLE 1

Preparation of Isocyanate Polymer

Into a 3-necked, 2 liter round bottomed flask maintained under a nitrogen atmosphere and equipped with an addition funnel, condenser and stirrer is added 500 g of toluene. To the addition funnel is added a mixture of 204 g of ethyl acrylate, 204 g of methyl methacrylate, 92 g of 2-isocyanatoethyl methacrylate (IEM) and 2.5 g of azobis(isobutyronitrile) (AZO). The solvent in the flask is warmed to reflux after which the monomers are added dropwise over a two-hour period to the reaction vessel. Thereafter, the reaction mixture is held at reflux with stirring for a three-hour postreaction period. The resulting reaction mixture contains 47 weight percent of polymer solids wherein the polymer has a number average molecular weight of about 20,000 and contains 4.96 weight percent of isocyanate.

Preparation of an Oxirane Polymer

Into a 250-ml round bottomed, 3-necked flask fitted with an air-driven paddle stirrer, a water condenser topped with a drying tube, an addition funnel and a controlled heating lamp is charged 50.08 g of the isocyanate polymer solution described above (0.0278 mole NCO (isocyanate)). The contents of the flask are heated to 50° C. and 2.06 g of glycidol (0.0278 mole) containing one drop of stannous octoate are added dropwise over six minutes. The addition funnel is rinsed with 10 ml of dry toluene which are then added dropwise to the reaction mixture.

The reaction mixture is continued for approximately 11 hours at 50° C. and then for 32 hours at ambient conditions, during which time an additional 4.12 g of glycidol, 3 drops of stannous octoate and 15 ml toluene are added in increments. The progress of the reaction is followed by infrared analysis until the NCO band disappears. The resulting product is 38 percent solution of the oxirane polymer in toluene.

Preparation and Curing of Curable Coating Composition

A 10.16-g portion of the 38 percent solids solution of the oxirane polymer, 0.09 g of 95 percent diethylenetriamine and 2 g of toluene are combined as a coating formulation and cast onto a steel panel using a #30 wire rod. The coated panel is heated at 100° C. for 2 hours. The resulting coating is hard and exhibits a satin finish. The coating shows some damage after 40 double rubs with a cotton swab soaked with methyl ethyl ketone and fails after 70 double rubs.

A coating formulation similar to the aforementioned, except that 0.4 g of the 95 percent diethylenetriamine is employed, passes 100 double rubs with methyl ethyl ketone after curing at 100° C. for 2 hours and 2 days at ambient conditions.

Similar results are obtained when 2,4,6-(tris-(dimethylamino)methyl)phenol is substituted for diethylenetriamine in the aforementioned formulation.

EXAMPLE 2

Following the procedure of Example 1, an oxirane polymer is prepared by charging 50 g of a 51.6 percent isocyanate polymer solution in 2-ethoxy ethyl acetate (EEA) to the 250 ml flask. The isocyanate polymer is a terpolymer of 37.5 percent ethyl acrylate, 37.5 percent methyl methacrylate and 25 percent 2-isocyanatoethyl methacrylate. The flask is heated to 49° C. and 2 drops of stannous octoate are added followed by the addition of 3.08 g (0.0416 mole) of glycidol over a 7-minute period. Two additional ml of EEA are used to rinse the addition funnel and then added to the flask. The reaction is continued for 8 hours at 49° C., 17 hours at ambient conditions and then 5 hours at 78° C. During the latter 5-hour period, an additional 3.35 g of glycidol are added. By an amine/HCl titration, it is determined that 36 percent of NCO has been reacted with glycidol. The resulting reaction product is a 55 percent solution of the oxirane polymer in EEA and unreacted glycidol.

This polymer solution containing the self-crosslinking oxirane polymer having pendant unreacted NCO moieties is cast onto a steel panel using a #40 wire rod and heated to 182° C. for 15 minutes. The resulting coating is hard and glossy and is resistant to 20 double rubs with a cotton swab soaked with methyl ethyl ketone.

For purposes of comparison, a similar formulation is prepared using the isocyanate polymer of this Example which has not been reacted with glycidol. A coating prepared therefrom and cured by the same procedure fails at 7 double rubs with the cotton swab soaked with methyl ethyl ketone.

Solvent resistance of the self-crosslinked oxirane polymer is improved by heating the coated panel for 30 minutes at 182° C. or by including tetrabutyl ammonium iodide in the coating formulation in a concentration of 1 weight percent based on the oxirane polymer, the unreacted glycidol and unreacted isocyanate polymer.

What is claimed is:

1. An oxirane polymer having a carbon-to-carbon polymeric backbone bearing at least two oxirane moieties per polymer molecule wherein the oxirane moieties are represented by the formula:

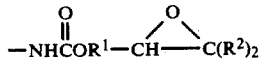

wherein $R^1$ is alkylene or inertly substituted alkylene and each $R^2$ is independently hydrogen, alkyl or inertly substituted alkyl.

2. The oxirane polymer of claim 1 wherein the oxirane moieties are represented by the formula:

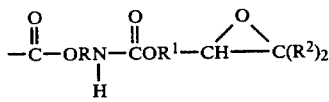

wherein R is alkylene or inertly substituted alkylene having 2 to 6 carbons.

3. The oxirane polymer of claim 2 wherein the oxirane moieties are represented by the formula:

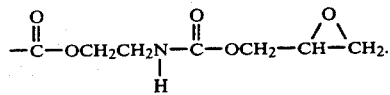

4. The oxirane polymer of claim 1 wherein the polymer is a self-crosslinking polymer which bears unreacted isocyanate moieties as well as the oxirane moieties.

5. The oxirane polymer of claim 2 wherein the polymer also bears unreacted isocyanate moieties represented by the formula:

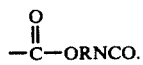

6. A curable composition comprising the polymer of claim 1 and an amount of an epoxy curing agent effective to cross-link the polymer to a water- and hydrocarbon-insoluble material.

7. The curable composition of claim 6 comprising the polymer of claim 2 and a curing agent which is a polyol or a polyamine.

8. An oxirane polymer having a carbon-carbon polymeric backbone bearing at least two oxirane moieties per polymer molecule wherein the oxirane moieties are represented by the formula:

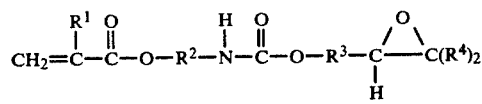

in which $R^1$ is a hydrogen or methyl group; $R^2$ is an alkylene or inertly substituted alkylene having 2 to 6 carbon atoms; $R^3$ is an alkylene or inertly substituted alkylene; and each $R^4$ is independently hydrogen alkyl or inertly substituted alkyl and wherein the carbon-carbon double bond has been polymerized as part of the backbone of the polymer.

9. The polymer of claim 8 wherein $R^1$ is a methyl group.

10. The polymer of claim 8 wherein $R^2$ is ethyl; $R^3$ is a methyl and each $R^4$ is hydrogen.

11. The polymer of claim 8 wherein the polymer also bears unreacted isocyanate moieties.

12. A curable composition comprising the polymer of claim 11 and an amount of an epoxy curing agent effective to cross-link the polymer to a water- and hydrocarbon-insoluble material.

* * * * *

UNITED STATES PATENT AND TRADEMARK OFFICE
CERTIFICATE OF CORRECTION

PATENT NO. : 4,397,993
DATED : August 9, 1983
INVENTOR(S) : Nancy B. Tefertiller; Robert F. Harris It is certified that error appears in the above—identified patent and that said Letters Patent is hereby corrected as shown below:

Col. 3, line 12: Please delete "2-isocyanataoethyl" and insert --2-isocyanatoethyl--.

Col. 5, line 18: Please delete "catalyst" and insert --catalysts--.

Signed and Sealed this

Eighth Day of May 1984

[SEAL]

Attest:

Attesting Officer

GERALD J. MOSSINGHOFF
Commissioner of Patents and Trademarks